US012530147B2

(12) United States Patent
Palmer

(10) Patent No.: US 12,530,147 B2
(45) Date of Patent: Jan. 20, 2026

(54) SEQUENTIALIZING DATA OF A MEMORY SYSTEM

(71) Applicant: Micron Technology, Inc., Boise, ID (US)

(72) Inventor: David Aaron Palmer, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/774,439

(22) Filed: Jul. 16, 2024

(65) Prior Publication Data

US 2025/0117156 A1    Apr. 10, 2025

Related U.S. Application Data

(60) Provisional application No. 63/542,740, filed on Oct. 5, 2023.

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 2013/0297859 | A1* | 11/2013 | Ishikawa | G06F 12/0246 711/103 |
| 2014/0207997 | A1* | 7/2014 | Peterson | G06F 12/0246 711/159 |
| 2019/0102249 | A1* | 4/2019 | Bolkhovitin | G06F 11/1068 |
| 2019/0102250 | A1* | 4/2019 | O'Krafka | G06F 11/1068 |
| 2021/0334209 | A1* | 10/2021 | Ke | G06F 12/0246 |
| 2023/0195617 | A1* | 6/2023 | Cheng | G06F 12/0246 711/154 |
| 2023/0236966 | A1* | 7/2023 | Yarimi | G06F 3/0638 711/170 |

* cited by examiner

*Primary Examiner* — Yaima Rigol
(74) *Attorney, Agent, or Firm* — Holland & Hart LLP

(57) ABSTRACT

In accordance with examples as described herein, a memory system may initialize a data optimization operation by transmitting signaling to a host system. For example, the memory system may identify data associated with non-sequential logical block addresses (LBAs), and may indicate the discontinuous LBAs to the host system. In response, the host system may indicate which of the discontinuous LBAs represent sequential data. Accordingly, the memory system may sequentialize the one or more of the discontinuous LBAs to defragment the associated data.

21 Claims, 7 Drawing Sheets

SEQUENTIALIZING DATA OF A MEMORY SYSTEM

CROSS REFERENCE

The present Application for Patent claims priority to U.S. Patent Application No. 63/542,740 by David Aaron Palmer, entitled "SEQUENTIALIZING DATA OF A MEMORY SYSTEM," filed Oct. 5, 2023, which is assigned to the assignee hereof, and which is expressly incorporated by reference in its entirety herein.

TECHNICAL FIELD

The following relates to one or more systems for memory, including sequentializing data of a memory system.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not- or (NOR) and not- and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

In some cases, data stored to a memory system may be fragmented. For example, a host system may transmit data associated with non-sequential logical block addresses (LBAs) to a memory system, and the memory system may store (e.g., write) the data to sequential physical block addresses (PBAs). Alternatively, the host system may transmit data with sequential LBAs to the memory system, and the memory system may write the data to non-sequential PBAs. Accordingly, data associated with discontinuous (e.g., non-sequential) LBAs may be written to continuous (e.g., sequential) PBAs at the memory system. Although conventional host systems may sequentialize (e.g., defragment) fragmented data, identifying and sequentializing fragmented data by a memory system may be desirable.

In accordance with examples as described herein, a memory system may initiate a data optimization operation, which may optimize (e.g., sequentialize) stored data. For example, the memory system may identify data associated with non-sequential LBAs, and may indicate the discontinuous LBAs to the host system. In response, the host system may indicate which of the discontinuous LBAs are associated with sequential data (e.g., non-fragmented data, data written to sequential PBAs). Accordingly, the memory system may sequentialize data associated with one or more discontinuous LBAs to defragment the associated data. In some cases, after the data is sequentialized, the memory system may perform one or more additional optimizations (e.g., logical-to-physical (L2P) table compression, granularity adjustment, and the like). By sequentializing fragmented data, signaling between the memory system and host system may be reduced and the overall performance of the memory system may be improved, among other advantages.

In addition to applicability in memory systems as described herein, techniques for sequentializing data of a memory system may be generally implemented to improve the performance of various electronic devices and systems. Some electronic device applications, including gaming and other high-performance applications, may be associated with relatively high processing requirements while also benefitting from relatively quick response times to improve user experience. As such, increasing processing speed, decreasing response times, or otherwise improving the performance electronic devices may be desirable. Implementing the techniques described herein may improve the performance of electronic devices by improving accessibility to relatively large sequences of data, which may decrease read response times and improve user experience, among other benefits.

Figure 1:
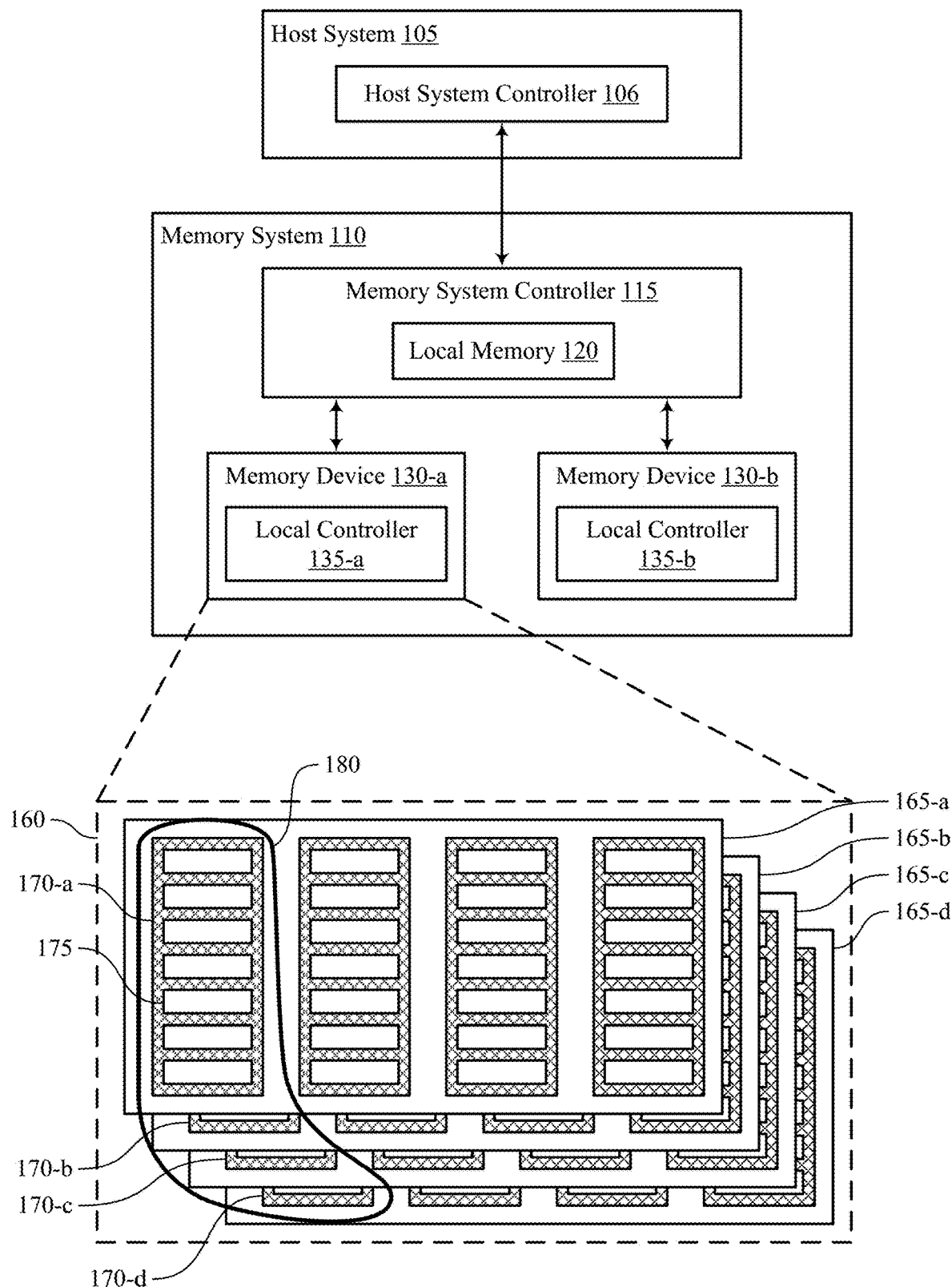
FIG. 1 illustrates an example of a system that supports sequentializing data of a memory system in accordance with examples as disclosed herein.
Figure 2:
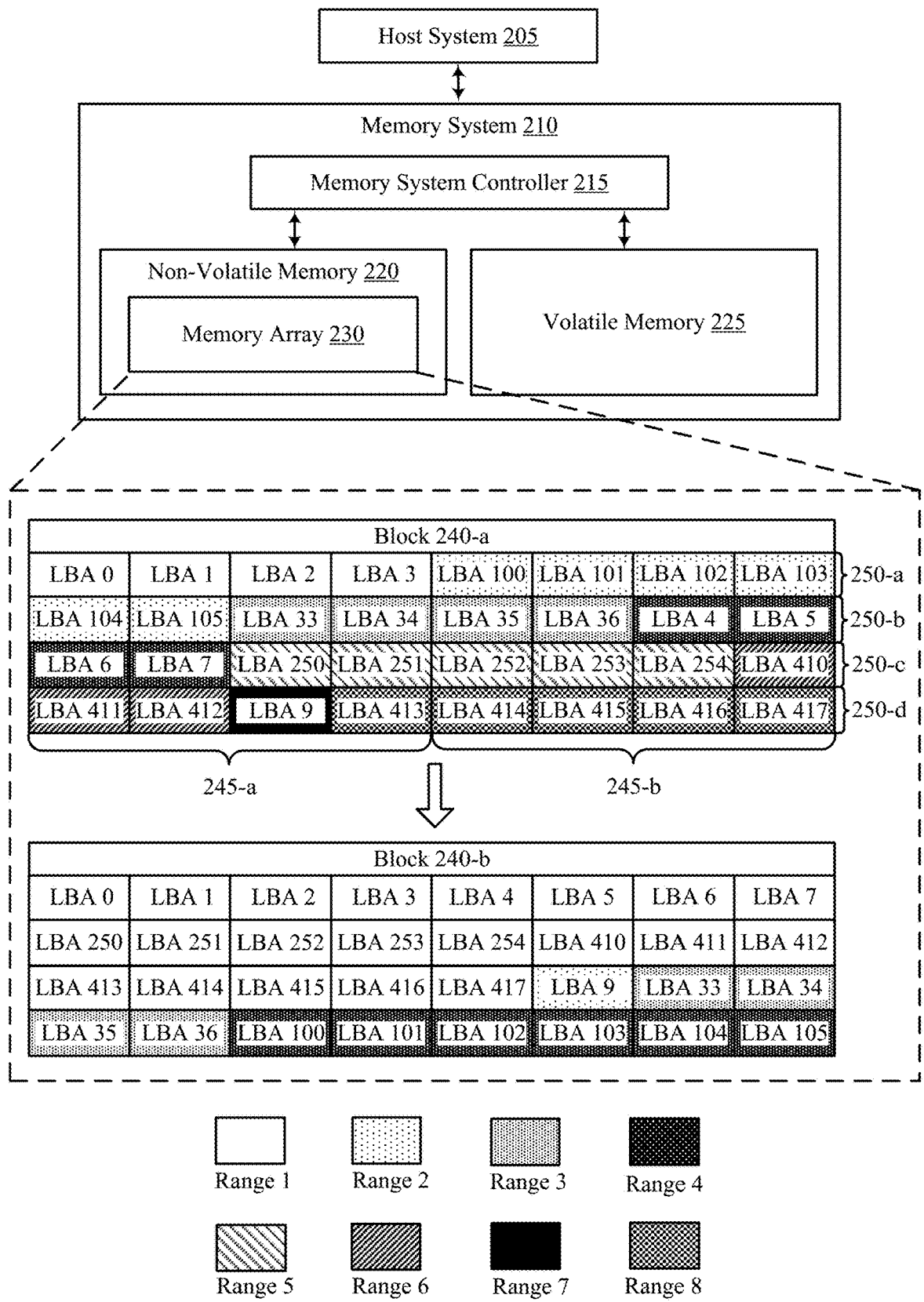
FIG. 2 illustrates an example of a system that supports sequentializing data of a memory system in accordance with examples as disclosed herein.

Features of the disclosure are initially described in the context of systems, with reference to FIGS. 1 through 2. Features of the disclosure are described in the context of a process flow with reference to FIG. 3. These and other features of the disclosure are further illustrated by and described in the context of apparatus diagrams and flowcharts that relate to sequentializing data of a memory system with reference to FIGS. 4 through 7.

FIG. 1 illustrates an example of a system 100 that supports sequentializing data of a memory system in accordance with examples as disclosed herein. The system 100 includes a host system 105 coupled with a memory system 110. The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated, which may be due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support sequentializing data of a memory system. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

In accordance with examples as described herein, the memory system 110 may initiate a data optimization operation, which may optimize (e.g., sequentialize) stored data. For example, the memory system 110 may identify data associated with non-sequential LBAs, and may indicate the discontinuous LBAs to the host system 105. In response, the host system 105 may indicate which of the discontinuous LBAs are associated with sequential data (e.g., non-fragmented data). Accordingly, the memory system 110 may sequentialize data associated with one or more discontinuous LBAs to defragment the associated data. In some cases, after the data is sequentialized, the memory system 110 may perform one or more additional optimizations (e.g., logical-to-physical (L2P) table compression, adjusting mapping granularity, and the like). By sequentializing fragmented data, signaling between the memory system 110 and host system 105 may be reduced and the overall performance of the memory system 110 may be improved, among other advantages.

FIG. 2 illustrates an example of a system 200 that supports sequentializing data of a memory system in accordance with examples as disclosed herein. The system 200 may implement aspects of a system 100, as described with reference to FIG. 1. For example, the system 200 may include a host system 205 and a memory system 210, which may be examples of a host system 105 and a memory system 110, as described with reference to FIG. 1, respectively. The system 200 may include the memory system 210 operable to communicate with the host system 205 via a memory system controller 215. The memory system controller 215 may be operable to perform operations on the memory system 210 in accordance with signaling (e.g., commands) from the host system 205. In some cases, the memory system controller 215 may be operable to sequentialize data stored at the block 240, which may reduce signaling between the memory system 210 and host system 205 and improve the overall performance of the memory system 210, among other advantages.

The memory system 210 may include non-volatile memory 220 and volatile memory 225, which may be examples of respective memory devices 130, as described with reference to FIG. 1. The non-volatile memory 220 may include a memory array 230 which may include blocks of non-volatile memory cells (e.g., NAND memory cells). Each memory cell may be addressable by a respective PBA. For example, the memory array 230 may include a block 240, which may be an example of a block 170, as described with reference to FIG. 1. For example, the block 240 may include a first plane 245-*a* with a first physical block of memory cells and a second plane 245-*b* with a second physical block of memory cells. The first physical block and the second physical block may be associated with a set of pages 250-*a*, 250-*b*, 250-*c*, and 250-*d*, which may each be an example of a page 175 as described with reference to FIG. 1. Each memory cell of the block 240 may include (e.g., store) physical data associated with a respective LBA indicated by the host system 205. For example, the host system 205 may transmit a set of data with one or more respective LBAs to the memory system controller 215, and the memory system controller 215 may store the set of data at one or more respective PBAs of the block 240. Accordingly, a set of physical data may be associated with a respective range of LBAs.

In some cases, the host system 205 may transmit a set of data associated with one or more non-sequential LBAs, and the memory system controller 215 may store the set of data at one or more sequential PBAs of the block 240. Alternatively, the host system 205 may transmit a set of data associated with one or more sequential LBAs, and the memory system controller 215 may store the set of data across one or more non-sequential PBAs of the block 240. Thus, to defragment the set of data stored at the block 240, the memory system controller may sequentialize the associated LBAs within the block 240.

The memory system 210 may exchange signaling with the host system 205 to initiate the process for sequentialization and to identify LBAs for sequentialization. The memory system controller 215 may transmit, to the host system 205, a first request to sequentialize one or more sets of data stored in the block 240-a. In some cases, the memory system controller 215 may transmit the first request based on one or more characteristics of the one or more sets of data stored in the block 240-a. For example, the memory system controller 215 may identify a set of data as satisfying a threshold quantity of data (e.g., a relatively large quantity of data). Additionally, or alternatively, the memory system controller 215 may identify a set of data (e.g., the block 240-a) as being infrequently accessed (e.g., static data, cold data, or the like). In some examples, the memory system controller 215 may identify a set of data for sequentialization based on the type of data stored at the block 240-a (e.g., media files, including pictures, music, videos, or the like).

In some cases, the first request may be transmitted over one or more signals, which may be transmitted over one or more data paths. For example, the memory system controller 215 may indicate, to the host system 205, an exception condition for sequentializing of the block 240-a. In response, the host system 205 may transmit signaling requesting additional information associated with the exception condition to assess whether to sequentialize the block 240-a. Accordingly, the memory system controller 215 may transmit the additional condition information associated with the exception condition based on receiving the signaling from the host system 205. In some examples, the memory system controller 215 may additionally transmit an acknowledgement message (e.g., an ACK) to indicate that the transmission of the additional condition information is complete. Based on the exception condition indication, the additional condition information, or both, the host system 205 may determine whether to initiate the process for sequentialization of the block 240-a.

If the host system 205 determines to initiate the sequentialization processes, the host system 205 may transmit additional signaling (e.g., a second request) to the memory system 210. For example, the second request may be a request for the memory system controller 215 to generate a first set of candidate LBAs for the host system 205 to assess (e.g., analyze).

To generate the first set of candidate LBAs, the memory system controller 215 may access the block 240-a to identify data associated with non-sequential LBAs and sequential PBAs. In some examples, the memory system controller 215 may identify pairs of non-sequential LBAs. For example, each pair may include a first LBA (e.g., LBA 3) associated with a first PBA of the block 240-a and a second LBA (e.g., LBA 100) associated with an adjacent PBA of the block 240-a, as illustrated by block 240-a. Further, the first LBA may be associated with a first set of sequential LBAs (e.g., (LBA 0 through LBA 3) associated with a first range of PBAs (e.g., range 1) and the second LBA may be associated with a second set of sequential LBAs (e.g., LBA 100 through LBA 105) at a second range of PBAs (e.g., range 2). In some cases, the memory system controller 215 may build (e.g., compile) the first set (e.g., a list) of the candidate LBAs using the identified pairs of non-sequential LBAs (e.g., (LBA 3, LBA 100), (LBA 105, LBA 33), (LBA 36, LBA 4), (LBA 7, LBA 250), (LBA 254, 410), (LBA 412, LBA 9), (LBA 9, LBA 413), or the like).

In response to the second request, the memory system controller 215 may transmit a first indication of the first set of candidate LBAs to the host system 205. In some cases, the indication may include the first set of the candidate LBAs. In other examples, the first indication may include multiple indications each representing a respective pair of LBAs, a respective LBA, or the like. In some cases, the first indication may be transmitted over multiple signals. For example, after transmitting the first set of the candidate LBAs, the memory system controller 215 may transmit an acknowledgement signal to the host system 205. The acknowledgement message may indicate that the second request (e.g., command) from the host system 205 is complete.

Based on the second indication, the host system 205 may determine whether one or more LBAs (e.g., one or more pairs of non-sequential LBAs) of the first set of candidate LBAs are associated with sequential data. Sequential data may be an ordered (e.g., non-random) sequence of data. In some examples, the sequence of data may be associated with certain types of files or data (e.g., media files, pictures, music, video, or the like). Specifically, for a first pair of non-sequential LBAs associated with sequential data, the sequential data may include a first ordered sequence of data (e.g., bits) for the first LBA and a second ordered sequence of data for the second LBA. If the first ordered sequence and the second ordered sequence represent a continuous portion of a media file, the host system 205 may determine that the first pair of non-sequential LBAs is associated with sequential data. For example, a first pair of LBAs may be associated with a set of sequential data written to sequential PBAs of the block 240-a. Therefore, although the first pair of LBAs are non-sequential (e.g., LBA 7 and LBA 250), the associated data of the pair of LBAs may be sequential. For example, the set data stored at range 4 of the block 240-a and the set of data stored at range 5 of the block 240-a may be sequential subsets of the same set of data. Accordingly, the host system 205 may determine that the first pair of LBAs does not require additional sequentialization.

Additionally, or alternatively, the host system 205 may identify one or more LBAs (e.g., one or more pairs of LBAs) of the first set of candidate LBAs associated with non-sequential data. For example, a second pair of LBAs may be associated with a set of non-sequential data written to sequential PBAs (e.g., adjacent memory cells) of the block 240-a. Therefore, both the pair of LBAs (e.g., LBA 3 and LBA 100) and the associated data may be non-sequential. Accordingly, the host system 205 may determine that the second pair of LBAs, and the associated sets of sequential LBAs (e.g., LBA 0 through LBA 3 and LBA 100 through LBA 105) may be candidates for sequentialization.

In some cases, the host system 205 may build (e.g., compile) a second set (e.g., a list) of LBAs with pairs of LBAs from the first set of LBAs. For example, the second set may include one or more pairs of LBAs associated with sequential data (e.g., (LBA 7, LBA 250), (LBA 254, 410), or the like). In alternative examples, the second set may include the one or more pairs of LBAs associated with non-sequential data (e.g., (LBA 3, LBA 100), (LBA 105, LBA 33), (LBA 36, LBA 4), (LBA 412, LBA 9), (LBA 9, LBA 413), or the like). The host system 205 may transmit a second indication to the memory system 210, and the memory system 210 may receive the write command at the memory system controller 215. In some cases, the second indication may include the second set of LBAs. Alternatively, the second indication may include multiple indications each representing a respective pair of LBAs, a respective LBA, or the like, from the second set of LBAs.

In some cases, the second indication may be transmitted in combination with one or more additional signals. For example, the host system 205 may indicate that the host system 205 is ready to send the second set, or an indication of the second set, to the memory system controller 215. In response, the memory system controller 215 may indicate that the memory system controller 215 is ready for the transmission (e.g., the transfer) from the host system 205. Accordingly, the host system 205 may transmit the second indication based at least in part on the indication of readiness from the memory system controller 215. Additionally, or alternatively, after the second indication is transmitted to the memory system controller 215, the memory system controller 215 may transmit an additional acknowledgement signal to the host system 205, indicating that the second indication was received.

Based receiving the second indication, the memory system controller 215 may perform a maintenance operation on the block 240. For example, the maintenance operation may include sequentializing one or more LBAs of the block 240. In some cases, when the second set includes one or more pairs of LBAs associated with sequential data, the memory system controller 215 may maintain (e.g., preserve) the order of each respective pair indicated by the second set. For example, for a first pair (e.g., (LBA 7, LBA 250)) of the second set, the memory system controller 215 may write (e.g., rewrite) the sequential set of data (e.g., LBA 4 through LBA 7 and LBA 250 through LBA 254) to a range of sequential PBAs of the block 240 (e.g., within range 1 of block 240-b).

Additionally, or alternatively, the memory system controller 215 may sequentialize (e.g., not preserve) one or more other LBAs or pairs of LBAs. For example, one or more pairs of non-sequential LBAs included in the first set and absent from the second set (e.g., (LBA 4, LBA 36)) may be associated with non-sequential data. Therefore, the memory system controller 215 may rewrite the non-sequential LBAs in a sequential order at sequential PBAs. For example, the sequential data associated with LBA 4 (e.g., LBA 4 through LBA 7) may be rewritten adjacent to LBA 3, creating a combined set of sequential data from LBA 0 to LBA 7.

In some cases, one or more LBAs of an LBA sequence may be absent from the block 240 (e.g., LBA 10, LBA 11, and so on), resulting in LBA gaps. Thus, when an LBA gap occurs, the memory system controller 215 may write data associated with the next available LBA (e.g., in ascending order) to the next adjacent memory cell, as illustrated by block 240-b. For example, where LBA 10 is not available, LBA 9 may be written adjacent to the next available range of sequential LBAs, LBA 33 through LBA 36. After LBA 36, another LBA gap may occur. Accordingly, LBA 36 may be written adjacent to the next available set of sequential LBAs, LBA 100 through LBA 105. In some cases, the maintenance operation may include one or more additional or alternative operations. For example, the maintenance operation may include a static wear leveling operation, a garbage collection operation, or both.

In some cases, the host system 205 may map (e.g., remap) one or more LBAs of the block to respective PBAs based at least in part on transmitting the indication of the second set of LBAs. In some cases, for each pair of LBAs indicated by the second set of LBAs, the host system 205 may remap PBAs from non-sequential LBAs to sequential LBAs. For example, the non-sequential LBAs associated with range 1 of block 240-b may be remapped to form a complete sequence of LBAs. Accordingly, LBA 250 through LBA 254 may be remapped to LBA 8 through LBA 12, and LBA 410 through LBA 417 may be remapped to LBA 13 through LBA 20. Therefore, after the remapping, range 1 of block 240-b may include a sequential set of LBA 0 through LBA 20.

In some cases, after the data is sequentialized, the memory system 210 may perform one or more additional optimizations. For example, the memory system controller 215 may compress one or more entries of an L2P table associated with the block 240-b (e.g., adjusting the granularity of the L2P table from 4 kilobytes to 8 kilobytes, or the like). Additionally, or alternatively, the memory system controller 215 may perform a subsequent sequentializing garbage collection operation. In some cases, sequentializing the data, and other optimizations described herein, may improve the performance of electronic devices by improving accessibility to relatively large sequences of data, which may decrease read response times and improve user experience, among other benefits.

Figure 3:
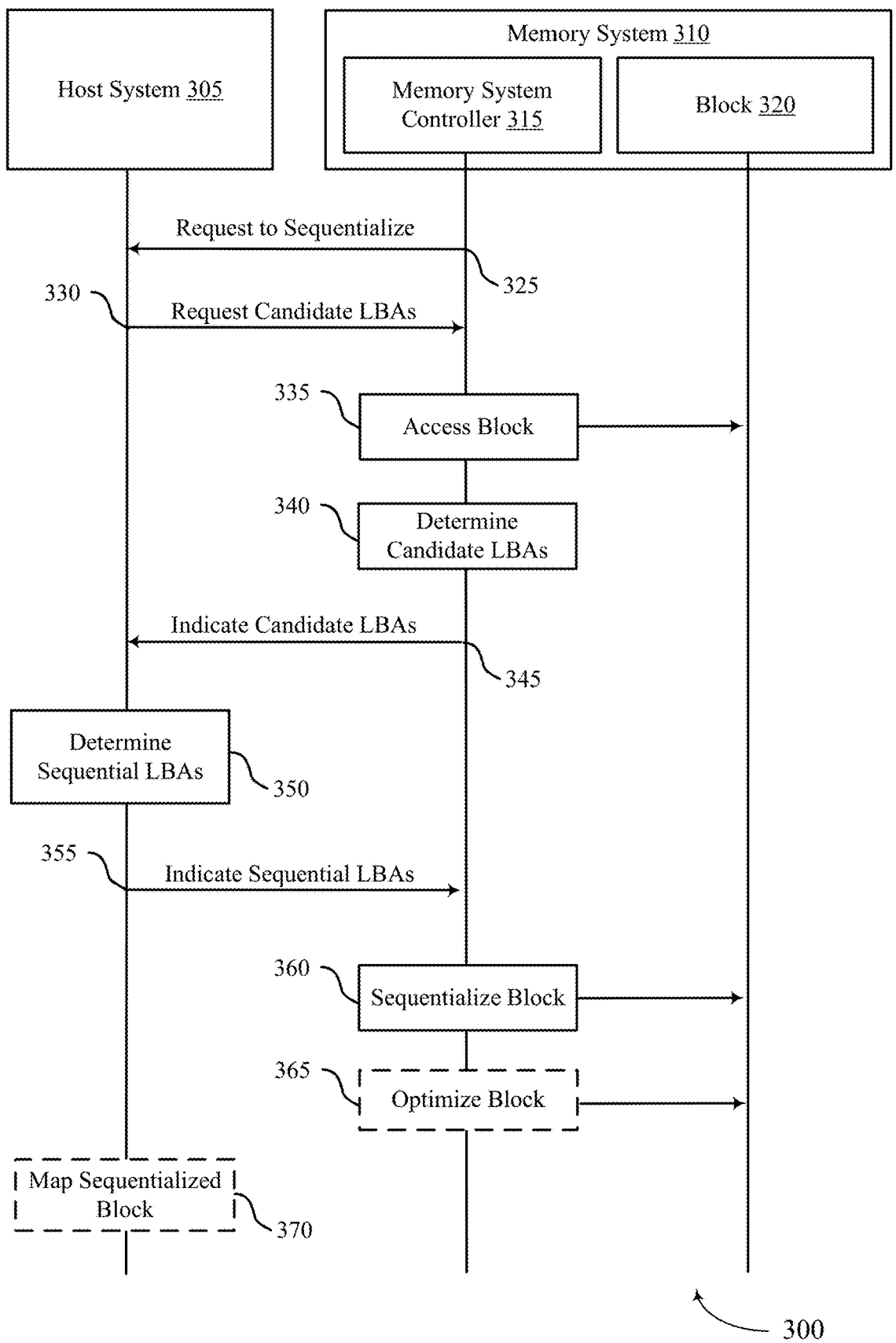
FIG. 3 illustrates an example of a process flow that supports sequentializing data of a memory system in accordance with examples as disclosed herein.

FIG. 3 illustrates an example of a process flow 300 that supports sequentializing data of a memory system in accordance with examples as disclosed herein. The process flow 300 may illustrate aspects or operations of the system 200 as described with reference to FIG. 2. For example, the process flow 300 may depict operations at a host system 305 and a memory system 310, which may be examples of a host system 205 and a memory system 210, respectively, as described with reference to FIG. 2. In accordance with operations as described herein, the memory system 310 may include a memory system controller 315 and a block 320, which may be examples of a memory system controller 215 and a block 240, respectively, as described with reference to FIG. 2.

In the following description of the process flow 300, the methods, techniques, processes, and operations may be performed in different orders or at different times. Further, certain operations may be left out of the process flow 300, or other operations may be added to the process flow 300.

At 325, the memory system controller 315 may transmit signaling (e.g., a first request) to the host system 305. For example, the first request may be a request to sequentialize one or more sets of data stored in the block 320. In some cases, the memory system controller 315 may transmit the first request based on one or more characteristics of the one or more sets of data stored in the block 320 (e.g., data type, quantity of data, or the like).

At 330, the host system 305 may transmit, in response to the first request, a second request to the memory system 310, and the memory system 310 may receive the write command at a memory system controller 315. The second request may be a request for the memory system controller 315 to generate a first set of candidate LBAs to assess (e.g., analyze).

At 335, the memory system controller 315 may access the block 320. For example, the memory system controller 315 may perform a read operation on the block 320, and read the one or more sets of data to be sequentialized from the block 320.

At 340, the memory system controller 315 may determine which LBAs may be included in first set of candidate LBAs requested by the host system 305. For example, based on accessing the block 320, the memory system controller 315 may identify data associated with one or more pairs of non-sequential LBAs and associated with one or more pairs of sequential PBAs (e.g., adjacent memory cells) in the block 320. In some examples, each identified pair of non-sequential LBAs may include a first LBA associated with a first PBA of the block 320 and a second LBA associated with an adjacent PBA of the block 320. In some cases, the memory system controller 315 may build (e.g., compile) the first set (e.g., a list) of the candidate LBAs using the identified pairs.

At 345, in response to the second request, the memory system controller 315 may transmit a first indication to the host system 305. In some cases, the indication may include the first set of the candidate LBAs.

At 350, the host system 305 may determine whether one or more LBAs (e.g., one or more pairs of non-sequential LBAs) of the first set of candidate LBAs are associated with sequential data. For example, a first pair of LBAs may be associated with a set of sequential data written to sequential PBAs of the block 320. Therefore, the first pair of LBAs may be non-sequential and the associated data may be sequential. Accordingly, the host system 305 may determine that the first LBA does not require additional sequentialization. Additionally, or alternatively, the host system 305 may identify one or more LBAs (e.g., one or more pairs of LBAs) of the first set of candidate LBAs associated with non-sequential data (e.g., to be sequentialized).

At 355, the host system 305 may transmit a second indication to the memory system 310, and the memory system 310 may receive the second indication at a memory system controller 315. In some cases, the second indication may include the second set of LBAs. Alternatively, the second indication may include multiple indications each representing a respective pair of LBAs, a respective LBA, or the like, from the second set of LBAs. In some cases, the indication, may be transmitted over multiple signals. In some cases, the second indication may be transmitted in combination with one or more additional signals, such as acknowledgement messages from the memory system controller 315.

At 360, the memory system controller 315 may perform a maintenance operation on the block 320 based on receiving the second indication. For example, the maintenance operation may include sequentializing one or more LBAs of the block 320. In some cases, when the second set includes one or more pairs of LBAs associated with sequential data, the memory system controller 315 may maintain (e.g., preserve) the order of each respective pair indicated by the second set. Additionally, the memory system controller 315 may sequentialize (e.g., not preserve) one or more other LBAs or pairs of LBAs. In some cases, the maintenance operation may include one or more additional operations (e.g., a static wear leveling operation, a garbage collection operation, or both).

In some cases, at 365, the memory system controller 315 may perform one or more additional optimization operations. For example, the memory system controller 315 may compress (e.g., reduce, minimize, or the like) an L2P table associated with the block 320 (e.g., adjusting the granularity of the L2P table from 4 kilobytes to 8 kilobytes, or the like). Additionally, or alternatively, the memory system controller 315 may perform a subsequent sequentializing garbage collection operation.

At 365, the host system 305 may map (e.g., remap) one or more LBAs of the block to respective PBAs based at least in part on transmitting the indication of the second set of LBAs. In some cases, for each pair of LBAs indicated by the second set of LBAs, the host system 305 may remap PBAs from non-sequential LBAs to sequential LBAs.

Figure 4:
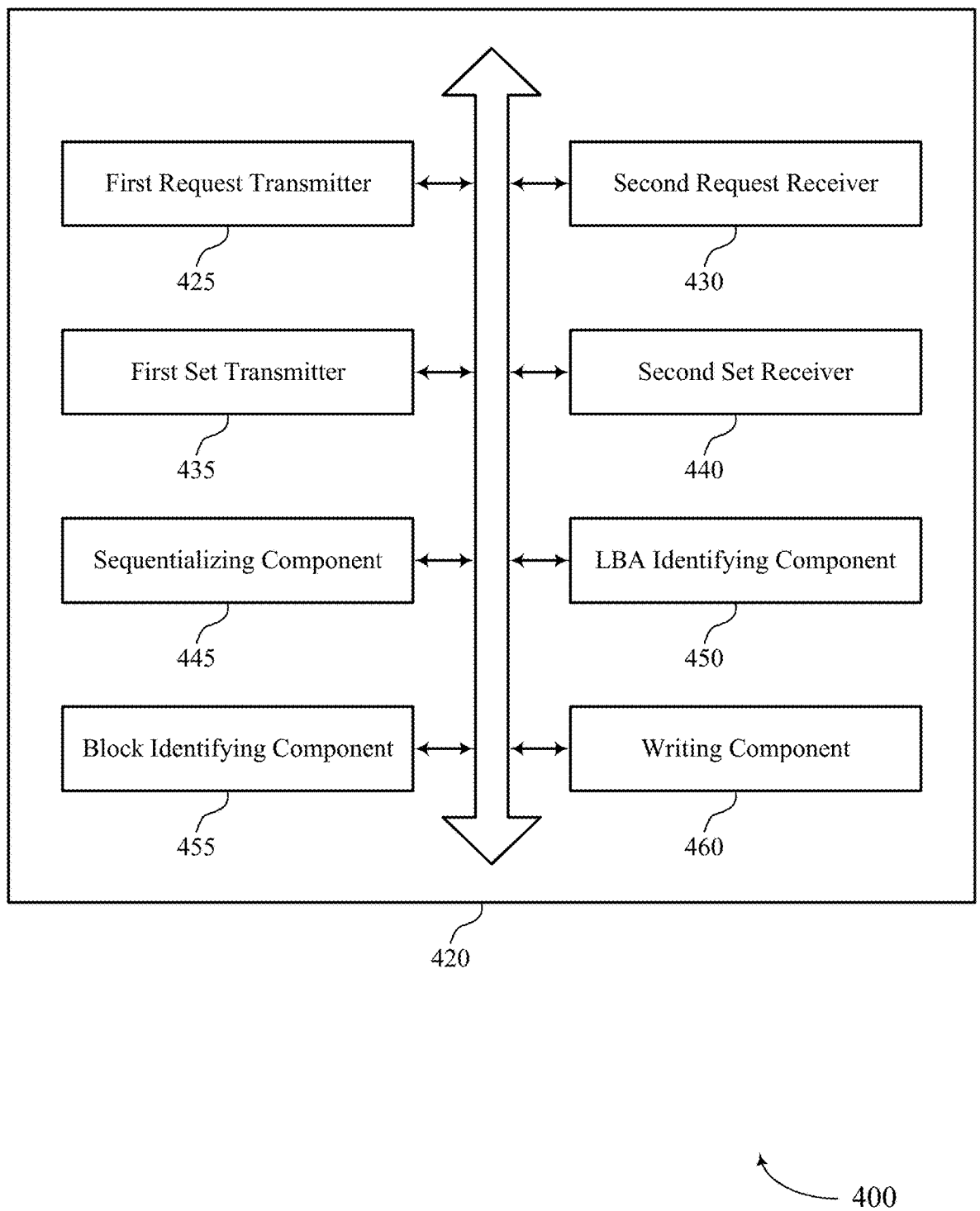
FIG. 4 illustrates a block diagram of a memory system that supports sequentializing data of a memory system in accordance with examples as disclosed herein.

FIG. 4 illustrates a block diagram 400 of a memory system 420 that supports sequentializing data of a memory system in accordance with examples as disclosed herein. The memory system 420 may be an example of aspects of a memory system as described with reference to FIGS. 1 through 3. The memory system 420, or various components thereof, may be an example of means for performing various aspects of sequentializing data of a memory system as described herein. For example, the memory system 420 may include a first request transmitter 425, a second request receiver 430, a first set transmitter 435, a second set receiver 440, a sequentializing component 445, an LBA identifying component 450, a block identifying component 455, a writing component 460, or any combination thereof. Each of these components may communicate, directly or indirectly, with one another (e.g., via one or more buses).

The first request transmitter 425 may be configured as or otherwise support a means for transmitting a first request to sequentialize one or more sets of data stored in a block of memory cells, each of the one or more sets of data associated with a respective range of logical addresses. The second request receiver 430 may be configured as or otherwise support a means for receiving, in response to transmitting the first request, a second request to generate a first set of logical addresses including one or more pairs of logical addresses each including a first logical address associated with a first physical address in the block of memory cells and including a second logical address associated with a second physical address in the block of memory cells, where the first logical address and the second logical address are non-sequential addresses and the first physical address and the second physical address are sequential addresses. The first set transmitter 435 may be configured as or otherwise support a means for transmitting an indication of the first set of logical addresses based at least in part on receiving the second request. The second set receiver 440 may be configured as or otherwise support a means for receiving an indication of a second set of logical addresses in response to transmitting the indication of the first set of logical addresses, where the second set of logical addresses includes a subset of the first set of logical addresses. The sequentializing component 445 may be configured as or otherwise support a means for performing a maintenance operation on the block of memory cells to sequentialize the second set of logical addresses within the block of memory cells based at least in part on receiving the indication of the second set of logical addresses.

In some examples, to support performing the maintenance operation on the block of memory cells, the sequentializing component 445 may be configured as or otherwise support a means for sequentializing one or more sets of data associated with the second set of logical addresses.

In some examples, to support sequentializing the one or more sets of data, the sequentializing component 445 may be configured as or otherwise support a means for writing data associated with the second set of logical addresses to sequential physical addresses within the block of memory cells.

In some examples, the LBA identifying component 450 may be configured as or otherwise support a means for identifying one or more pairs of non-sequential logical addresses based at least in part on receiving the second request, where the first set of logical addresses includes the one or more pairs of non-sequential logical addresses.

In some examples, a first pair of the second set of logical addresses indicates a last logical address of a first set of data and second pair of the second set of logical addresses indicates a first logical address of a second set of data.

In some examples, the first set of data and the second set of data are written to sequential physical addresses within the block of memory cells.

In some examples, the block identifying component 455 may be configured as or otherwise support a means for identifying the block of memory cells for the maintenance operation based at least in part on a characteristic of the one or more sets of data stored in the block, where transmitting the first request is based at least in part on identifying the block of memory cells.

In some examples, to support maintenance operation on the block, the writing component 460 may be configured as or otherwise support a means for writing data associated with a third set of logical addresses to one or more physical addresses within the block of memory cells.

In some examples, the third set of logical addresses includes one or more pairs of logical addresses included in the first set of logical addresses and not included in the second set of logical addresses.

In some examples, the second set of logical addresses is included in the first set of logical addresses.

In some examples, the maintenance operation on the block is associated with a static wear leveling operation, a garbage collection operation, or both.

Figure 5:
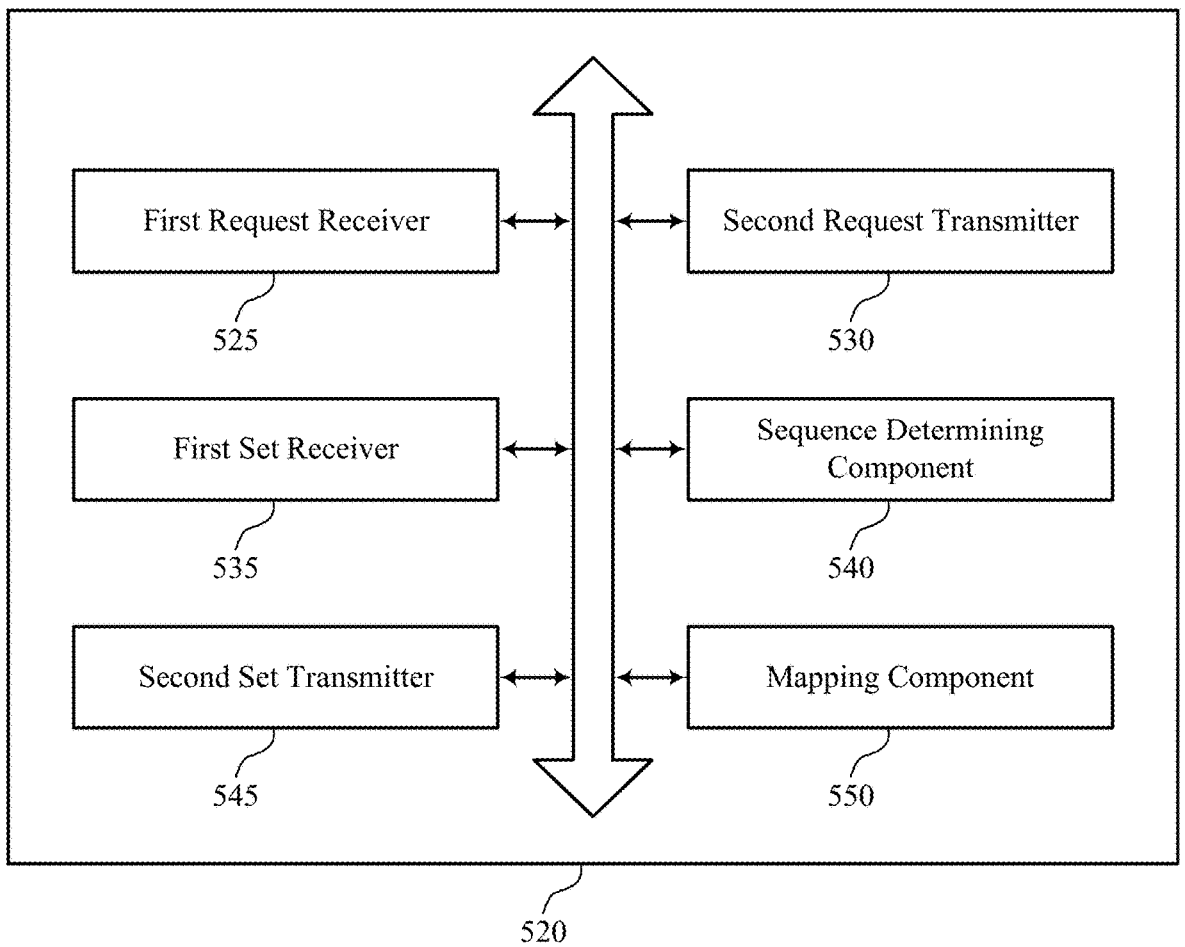
FIG. 5 illustrates a block diagram of a host system that supports sequentializing data of a memory system in accordance with examples as disclosed herein.

FIG. 5 illustrates a block diagram 500 of a host system 520 that supports sequentializing data of a memory system in accordance with examples as disclosed herein. The host system 520 may be an example of aspects of a host system as described with reference to FIGS. 1 through 3. The host system 520, or various components thereof, may be an example of means for performing various aspects of sequentializing data of a memory system as described herein. For example, the host system 520 may include a first request receiver 525, a second request transmitter 530, a first set receiver 535, a sequence determining component 540, a second set transmitter 545, a mapping component 550, or any combination thereof. Each of these components may communicate, directly or indirectly, with one another (e.g., via one or more buses).

The first request receiver 525 may be configured as or otherwise support a means for receiving a first request to sequentialize one or more sets of data stored in a block of memory cells, each of the one or more sets of data associated with a respective range of logical addresses. The second request transmitter 530 may be configured as or otherwise support a means for transmitting, based at least in part on receiving the first request, a second request to generate a first set of logical addresses including one or more pairs of logical addresses each including a first logical address associated with a first physical address in the block of memory cells and including a second logical address associated with a second physical address in the block of memory cells. The first set receiver 535 may be configured as or otherwise support a means for receiving an indication of the first set of logical addresses based at least in part on transmitting the second request. The sequence determining component 540 may be configured as or otherwise support a means for determining whether one or more logical addresses of the first set of logical addresses is associated with data written to sequential physical addresses in the block of memory cells. The second set transmitter 545 may be configured as or otherwise support a means for transmitting an indication of a second set of logical addresses based at least in part on determining that one or more logical addresses of the first set of logical addresses is associated with data written to sequential physical addresses in the block of memory cells, where the second set of logical addresses includes a subset of the first set of logical addresses.

In some examples, the mapping component 550 may be configured as or otherwise support a means for mapping one or more logical addresses of the second set of logical addresses to respective sequential physical addresses based at least in part on transmitting the indication of the second set of logical addresses.

Figure 6:
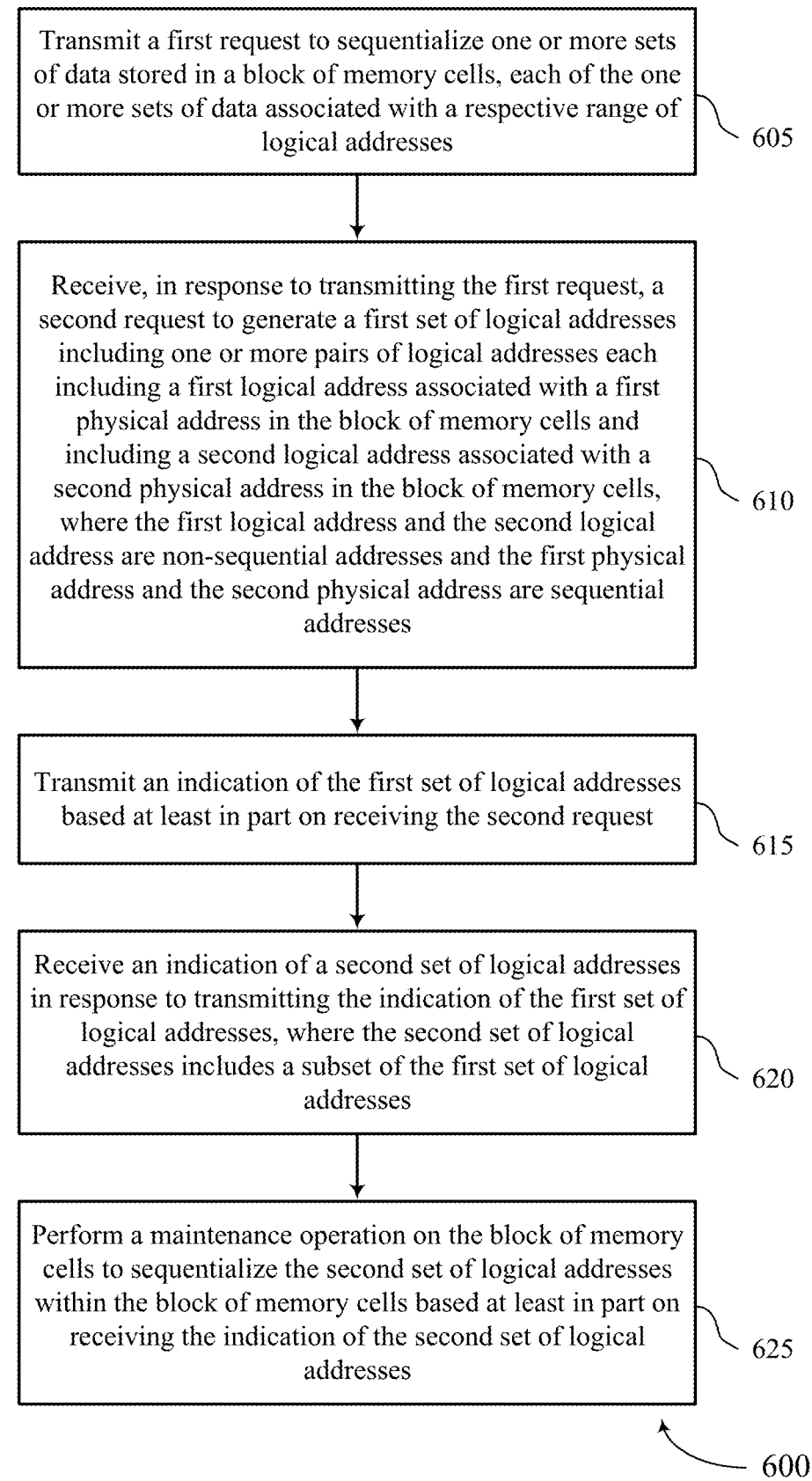
FIGS. 6 and 7 illustrate flowcharts showing a method or methods that support sequentializing data of a memory system in accordance with examples as disclosed herein.

FIG. 6 illustrates a flowchart showing a method 600 that supports sequentializing data of a memory system in accordance with examples as disclosed herein. The operations of method 600 may be implemented by a memory system or its components as described herein. For example, the operations of method 600 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 605, the method may include transmitting a first request to sequentialize one or more sets of data stored in a block of memory cells, each of the one or more sets of data associated with a respective range of logical addresses. The operations of 605 may be performed in accordance with examples as disclosed herein. In some examples, aspects of the operations of 605 may be performed by a first request transmitter 425 as described with reference to FIG. 4.

At 610, the method may include receiving, in response to transmitting the first request, a second request to generate a first set of logical addresses including one or more pairs of logical addresses each including a first logical address associated with a first physical address in the block of memory cells and including a second logical address associated with a second physical address in the block of memory cells, where the first logical address and the second logical address are non-sequential addresses and the first physical address and the second physical address are sequential addresses. The operations of 610 may be performed in accordance with examples as disclosed herein. In some examples, aspects of the operations of 610 may be performed by a second request receiver 430 as described with reference to FIG. 4.

At 615, the method may include transmitting an indication of the first set of logical addresses based at least in part on receiving the second request. The operations of 615 may be performed in accordance with examples as disclosed herein. In some examples, aspects of the operations of 615 may be performed by a first set transmitter 435 as described with reference to FIG. 4.

At 620, the method may include receiving an indication of a second set of logical addresses in response to transmitting the indication of the first set of logical addresses, where the second set of logical addresses includes a subset of the first set of logical addresses. The operations of 620 may be performed in accordance with examples as disclosed herein. In some examples, aspects of the operations of 620 may be performed by a second set receiver 440 as described with reference to FIG. 4.

At 625, the method may include performing a maintenance operation on the block of memory cells to sequentialize the second set of logical addresses within the block of memory cells based at least in part on receiving the indication of the second set of logical addresses. The operations of 625 may be performed in accordance with examples as disclosed herein. In some examples, aspects of the operations of 625 may be performed by a sequentializing component 445 as described with reference to FIG. 4.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for transmitting a first request to sequentialize one or more sets of data stored in a block of memory cells, each of the one or more sets of data associated with a respective range of logical addresses; receiving, in response to transmitting the first request, a second request to generate a first set of logical addresses including one or more pairs of logical addresses each including a first logical address associated with a first physical address in the block of memory cells and including a second logical address associated with a second physical address in the block of memory cells, where the first logical address and the second logical address are non-sequential addresses and the first physical address and the second physical address are sequential addresses; transmitting an indication of the first set of logical addresses based at least in part on receiving the second request; receiving an indication of a second set of logical addresses in response to transmitting the indication of the first set of logical addresses, where the second set of logical addresses includes a subset of the first set of logical addresses; and performing a maintenance operation on the block of memory cells to sequentialize the second set of logical addresses within the block of memory cells based at least in part on receiving the indication of the second set of logical addresses.

Aspect 2: The method, apparatus, or non-transitory computer-readable medium of aspect 1, where performing the maintenance operation on the block of memory cells includes operations, features, circuitry, logic, means, or instructions, or any combination thereof for sequentializing one or more sets of data associated with the second set of logical addresses.

Aspect 3: The method, apparatus, or non-transitory computer-readable medium of aspect 2, where sequentializing the one or more sets of data includes operations, features, circuitry, logic, means, or instructions, or any combination thereof for writing data associated with the second set of logical addresses to sequential physical addresses within the block of memory cells.

Aspect 4: The method, apparatus, or non-transitory computer-readable medium of any of aspects 1 through 3, further including operations, features, circuitry, logic, means, or instructions, or any combination thereof for identifying one or more pairs of non-sequential logical addresses based at least in part on receiving the second request, where the first set of logical addresses includes the one or more pairs of non-sequential logical addresses.

Aspect 5: The method, apparatus, or non-transitory computer-readable medium of any of aspects 1 through 4, where a first pair of the second set of logical addresses indicates a last logical address of a first set of data and second pair of the second set of logical addresses indicates a first logical address of a second set of data.

Aspect 6: The method, apparatus, or non-transitory computer-readable medium of aspect 5, where the first set of data and the second set of data are written to sequential physical addresses within the block of memory cells.

Aspect 7: The method, apparatus, or non-transitory computer-readable medium of any of aspects 1 through 6, further including operations, features, circuitry, logic, means, or instructions, or any combination thereof for identifying the block of memory cells for the maintenance operation based at least in part on a characteristic of the one or more sets of data stored in the block, where transmitting the first request is based at least in part on identifying the block of memory cells.

Aspect 8: The method, apparatus, or non-transitory computer-readable medium of any of aspects 1 through 7, where the maintenance operation on the block further includes operations, features, circuitry, logic, means, or instructions, or any combination thereof for writing data associated with a third set of logical addresses to one or more physical addresses within the block of memory cells.

Aspect 9: The method, apparatus, or non-transitory computer-readable medium of aspect 8, where the third set of logical addresses includes one or more pairs of logical addresses included in the first set of logical addresses and not included in the second set of logical addresses.

Aspect 10: The method, apparatus, or non-transitory computer-readable medium of any of aspects 1 through 9, where the second set of logical addresses is included in the first set of logical addresses.

Aspect 11: The method, apparatus, or non-transitory computer-readable medium of any of aspects 1 through 10, where the maintenance operation on the block is associated with a static wear leveling operation, a garbage collection operation, or both.

Figure 7:
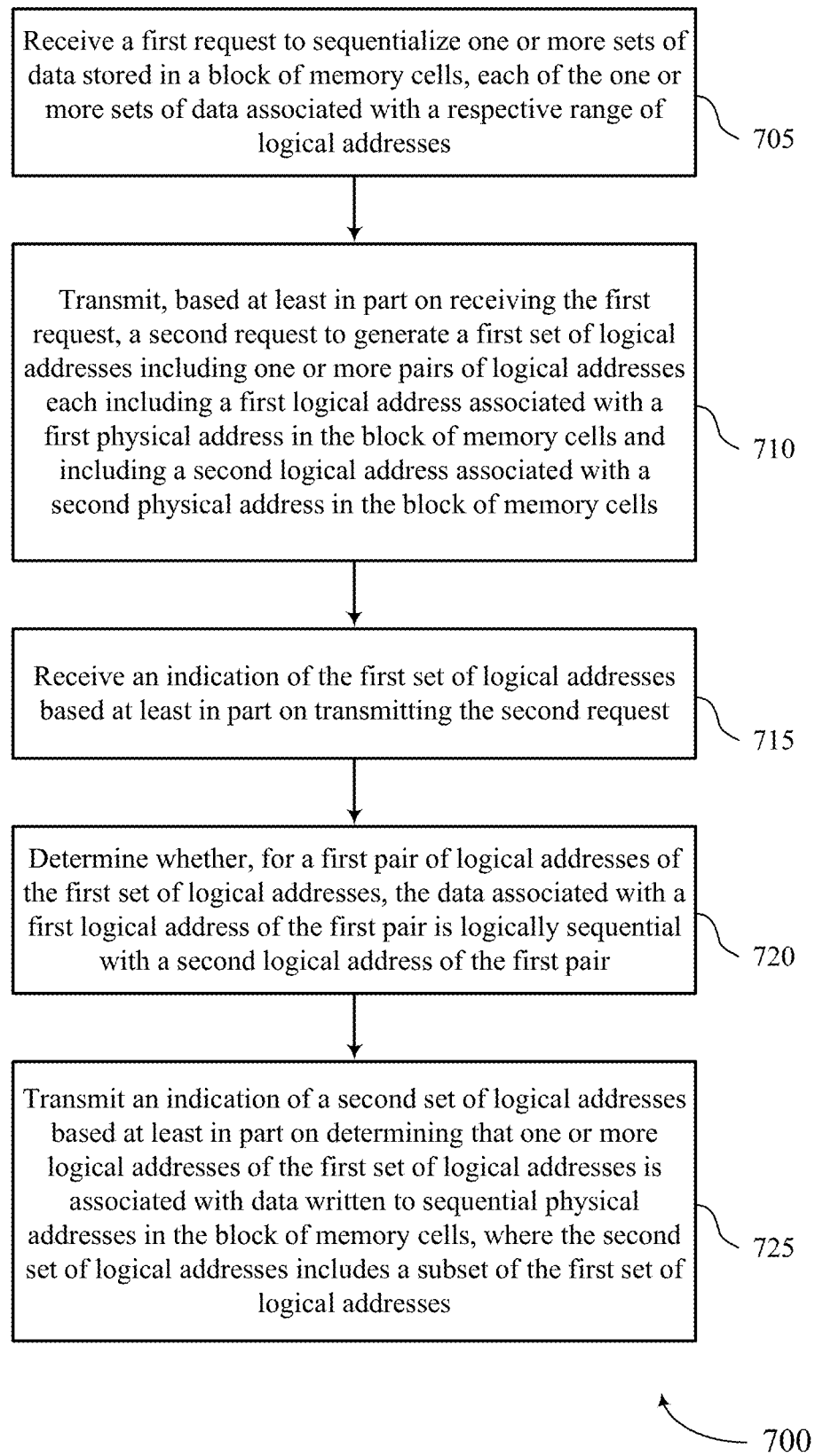

FIG. 7 illustrates a flowchart showing a method 700 that supports sequentializing data of a memory system in accordance with examples as disclosed herein. The operations of method 700 may be implemented by a host system or its components as described herein. For example, the operations of method 700 may be performed by a host system as described with reference to FIGS. 1 through 3 and 5. In some examples, a host system may execute a set of instructions to control the functional elements of the device to perform the described functions. Additionally, or alternatively, the host system may perform aspects of the described functions using special-purpose hardware.

At 705, the method may include receiving a first request to sequentialize one or more sets of data stored in a block of memory cells, each of the one or more sets of data associated with a respective range of logical addresses. The operations of 705 may be performed in accordance with examples as disclosed herein. In some examples, aspects of the operations of 705 may be performed by a first request receiver 525 as described with reference to FIG. 5.

At 710, the method may include transmitting, based at least in part on receiving the first request, a second request to generate a first set of logical addresses including one or more pairs of logical addresses each including a first logical address associated with a first physical address in the block of memory cells and including a second logical address associated with a second physical address in the block of memory cells. The operations of 710 may be performed in accordance with examples as disclosed herein. In some examples, aspects of the operations of 710 may be performed by a second request transmitter 530 as described with reference to FIG. 5.

At 715, the method may include receiving an indication of the first set of logical addresses based at least in part on transmitting the second request. The operations of 715 may be performed in accordance with examples as disclosed herein. In some examples, aspects of the operations of 715 may be performed by a first set receiver 535 as described with reference to FIG. 5.

At 720, the method may include determining whether one or more logical addresses of the first set of logical addresses is associated with data written to sequential physical addresses in the block of memory cells. The operations of 720 may be performed in accordance with examples as disclosed herein. In some examples, aspects of the operations of 720 may be performed by a determining component 540 as described with reference to FIG. 5.

At 725, the method may include transmitting an indication of a second set of logical addresses based at least in part on determining that one or more logical addresses of the first set of logical addresses is associated with data written to sequential physical addresses in the block of memory cells, where the second set of logical addresses includes a subset of the first set of logical addresses. The operations of 725 may be performed in accordance with examples as disclosed herein. In some examples, aspects of the operations of 725 may be performed by a second set transmitter 545 as described with reference to FIG. 5.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 12: A method, apparatus, or non-transitory computer-readable medium including operations, features, circuitry, logic, means, or instructions, or any combination thereof for receiving a first request to sequentialize one or more sets of data stored in a block of memory cells, each of the one or more sets of data associated with a respective range of logical addresses; transmitting, based at least in part on receiving the first request, a second request to generate a first set of logical addresses including one or more pairs of logical addresses each including a first logical address associated with a first physical address in the block of memory cells and including a second logical address associated with a second physical address in the block of memory cells; receiving an indication of the first set of logical addresses based at least in part on transmitting the second request; determining whether, for a first pair of logical addresses of the first set of logical addresses, the data associated with a first logical address of the first pair is logically sequential with a second logical address of the first pair; and transmitting an indication of a second set of logical addresses based at least in part on determining that the data associated with the first logical address of the first pair is logical sequential with the second logical address of the first pair, where the second set of logical addresses includes a subset of the first set of logical addresses.

Aspect 13: The method, apparatus, or non-transitory computer-readable medium of aspect 12, further including operations, features, circuitry, logic, means, or instructions, or any combination thereof for mapping one or more logical addresses of the second set of logical addresses to respective sequential physical addresses based at least in part on transmitting the indication of the second set of logical addresses.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
a memory device; and
processing circuitry coupled with the memory device and configured to cause the memory system to:
transmit a first request to sequentialize one or more sets of data stored in a block of memory cells, each of the one or more sets of data associated with a respective range of logical addresses;
receive, in response to transmitting the first request, a second request to generate a first set of logical addresses comprising one or more pairs of logical addresses each including a first logical address associated with a first physical address in the block of memory cells and including a second logical address associated with a second physical address in the block of memory cells, wherein the first logical address and the second logical address are non-sequential addresses and the first physical address and the second physical address are sequential addresses;
transmit an indication of the first set of logical addresses based at least in part on receiving the second request;
receive an indication of a second set of logical addresses in response to transmitting the indication of the first set of logical addresses, wherein the second set of logical addresses comprises a subset of the first set of logical addresses; and
perform a maintenance operation on the block of memory cells to sequentialize the second set of logical addresses within the block of memory cells based at least in part on receiving the indication of the second set of logical addresses.

2. The memory system of claim 1, wherein performing the maintenance operation on the block of memory cells is configured to cause the memory system to:
sequentialize one or more sets of data associated with the second set of logical addresses.

3. The memory system of claim 2, wherein sequentializing the one or more sets of data is configured to cause the memory system to:
write data associated with the second set of logical addresses to sequential physical addresses within the block of memory cells.

4. The memory system of claim 1, wherein the processing circuitry is further configured to cause the memory system to:
identify one or more pairs of non-sequential logical addresses based at least in part on receiving the second request, wherein the first set of logical addresses comprises the one or more pairs of non-sequential logical addresses.

5. The memory system of claim 1, wherein a first pair of the second set of logical addresses indicates a last logical address of a first set of data and second pair of the second set of logical addresses indicates a first logical address of a second set of data.

6. The memory system of claim 5, wherein the first set of data and the second set of data are written to sequential physical addresses within the block of memory cells.

7. The memory system of claim 1, wherein the processing circuitry is further configured to cause the memory system to:
identify the block of memory cells for the maintenance operation based at least in part on a characteristic of the one or more sets of data stored in the block, wherein transmitting the first request is based at least in part on identifying the block of memory cells.

8. The memory system of claim 1, wherein the maintenance operation on the block is further configured to cause the memory system to:
write data associated with a third set of logical addresses to one or more physical addresses within the block of memory cells.

9. The memory system of claim 8, wherein the third set of logical addresses comprises one or more pairs of logical addresses included in the first set of logical addresses and not included in the second set of logical addresses.

10. The memory system of claim 1, wherein the second set of logical addresses is included in the first set of logical addresses.

11. The memory system of claim 1, wherein the maintenance operation on the block is associated with a static wear leveling operation, a garbage collection operation, or both.

12. A non-transitory computer-readable medium storing code comprising instructions which, when executed by one or more processors of a memory system, cause the memory system to:
transmit a first request to sequentialize one or more sets of data stored in a block of memory cells, each of the one or more sets of data associated with a respective range of logical addresses;
receive, in response to transmitting the first request, a second request to generate a first set of logical addresses comprising one or more pairs of logical addresses each including a first logical address associated with a first physical address in the block of memory cells and including a second logical address associated with a second physical address in the block of memory cells, wherein the first logical address and the second logical address are non-sequential addresses and the first physical address and the second physical address are sequential addresses;
transmit an indication of the first set of logical addresses based at least in part on receiving the second request;
receive an indication of a second set of logical addresses in response to transmitting the indication of the first set of logical addresses, wherein the second set of logical addresses comprises a subset of the first set of logical addresses; and perform a maintenance operation on the block of memory cells to sequentialize the second set of logical addresses within the block of memory cells based at least in part on receiving the indication of the second set of logical addresses.

13. The non-transitory computer-readable medium of claim 12, wherein the instructions to perform the maintenance operation on the block of memory cells are executable by the one or more processors to:
sequentialize one or more sets of data associated with the second set of logical addresses.

14. The non-transitory computer-readable medium of claim 13, wherein the instructions to sequentialize the one or more sets of data are executable by the one or more processors to:
write data associated with the second set of logical addresses to sequential physical addresses within the block of memory cells.

15. The non-transitory computer-readable medium of claim 12, wherein the instructions, when executed by the one or more processors of the memory system, further cause the memory system to:
identify one or more pairs of non-sequential logical addresses based at least in part on receiving the second request, wherein the first set of logical addresses comprises the one or more pairs of non-sequential logical addresses.

16. The non-transitory computer-readable medium of claim 12, wherein a first pair of the second set of logical addresses indicates a last logical address of a first set of data and second pair of the second set of logical addresses indicates a first logical address of a second set of data.

17. The non-transitory computer-readable medium of claim 12, wherein the instructions, when executed by the one or more processors of the memory system, further cause the memory system to:
identify the block of memory cells for the maintenance operation based at least in part on a characteristic of the one or more sets of data stored in the block, wherein transmitting the first request is based at least in part on identifying the block of memory cells.

18. The non-transitory computer-readable medium of claim 12, wherein the instructions to perform the maintenance operation on the block are further executable by the one or more processors to:
write data associated with a third set of logical addresses to one or more physical addresses within the block of memory cells.

19. The non-transitory computer-readable medium of claim 12, wherein the maintenance operation on the block is associated with a static wear leveling operation, a garbage collection operation, or both.

20. The non-transitory computer-readable medium of claim 12, wherein the second set of logical addresses is included in the first set of logical addresses.

21. A method, comprising:
transmitting a first request to sequentialize one or more sets of data stored in a block of memory cells, each of the one or more sets of data associated with a respective range of logical addresses;
receiving, in response to transmitting the first request, a second request to generate a first set of logical addresses comprising one or more pairs of logical addresses each including a first logical address associated with a first physical address in the block of memory cells and including a second logical address associated with a second physical address in the block of memory cells, wherein the first logical address and the second logical address are non-sequential addresses and the first physical address and the second physical address are sequential addresses;
transmitting an indication of the first set of logical addresses based at least in part on receiving the second request;
receiving an indication of a second set of logical addresses in response to transmitting the indication of the first set of logical addresses, wherein the second set of logical addresses comprises a subset of the first set of logical addresses; and
performing a maintenance operation on the block of memory cells to sequentialize the second set of logical addresses within the block of memory cells based at least in part on receiving the indication of the second set of logical addresses.

\* \* \* \* \*